United States Patent
Honda et al.

(10) Patent No.: US 10,843,706 B2
(45) Date of Patent: Nov. 24, 2020

(54) VEHICLE CONTROL APPARATUS

(71) Applicant: HONDA MOTOR CO., LTD., Tokyo (JP)

(72) Inventors: Shigehiro Honda, Wako (JP); Kanta Tsuji, Wako (JP); Jun Ibuka, Wako (JP); Riho Harada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 232 days.

(21) Appl. No.: 15/839,013

(22) Filed: Dec. 12, 2017

(65) Prior Publication Data

US 2018/0162416 A1 Jun. 14, 2018

(30) Foreign Application Priority Data

Dec. 9, 2016 (JP) .................................. 2016-239731

(51) Int. Cl.
*B60W 50/14* (2020.01)
*B60W 40/04* (2006.01)
(Continued)

(52) U.S. Cl.
CPC .............. *B60W 50/14* (2013.01); *B60Q 1/34* (2013.01); *B60Q 1/346* (2013.01);
(Continued)

(58) Field of Classification Search
CPC ........ G08G 1/167; G08G 1/00; G08G 1/0112; G08G 1/0129
See application file for complete search history.

(56) References Cited

U.S. PATENT DOCUMENTS 9,852,626 B2 * 12/2017 Yoshitomi ................ B60Q 9/00
2010/0049405 A1 * 2/2010 Li ............................ G08G 1/168
701/45
(Continued)

FOREIGN PATENT DOCUMENTS

JP  2001-039213 A     2/2001
JP  2004-182161    *  7/2004
(Continued)

OTHER PUBLICATIONS

Office Action dated Jul. 2, 2018, in Japanese Patent Application No. 2016-239731.

*Primary Examiner* — Redhwan K Mawari
(74) *Attorney, Agent, or Firm* — Thomas | Horstemeyer, LLP (57) ABSTRACT

The present disclosure relates to a vehicle control apparatus capable of making a vehicle run by automated driving. The vehicle control apparatus can include a notification unit configured to notify a course change inside and/or outside the vehicle, and a control unit. The control unit can switch the control of the notification unit stepwise in a case in which the course change is necessary before a predetermined point during the automated driving. At a first stage, the notification unit can notify the course change on condition that the state in which the course change is enabled is set. At a second stage at which the vehicle is closer to the predetermined point than at the first stage, the notification unit can notify the course change without condition that the state in which the course change is enabled is set.

4 Claims, 9 Drawing Sheets

(51) Int. Cl.
*B60W 30/18* (2012.01)
*B60W 50/10* (2012.01)
*B60Q 1/34* (2006.01)
*G08G 1/16* (2006.01)

(52) U.S. Cl.
CPC ...... *B60W 30/18163* (2013.01); *B60W 40/04* (2013.01); *B60W 50/10* (2013.01); *G08G 1/167* (2013.01); *B60W 2540/215* (2020.02); *B60W 2554/80* (2020.02)

(56) References Cited

U.S. PATENT DOCUMENTS

| | | | |
|---|---|---|---|
| 2011/0130936 A1* | 6/2011 | Noda | G08G 1/167 701/70 |
| 2017/0018189 A1* | 1/2017 | Ishikawa | G05D 1/0088 |
| 2017/0082452 A1* | 3/2017 | Sumizawa | G08G 1/0141 |
| 2018/0162416 A1* | 6/2018 | Honda | B60W 50/10 |

FOREIGN PATENT DOCUMENTS

| | | | |
|---|---|---|---|
| JP | 2004-182161 A | | 7/2004 |
| JP | 2012-106733 A | | 6/2012 |
| JP | 2012-106733 | * | 7/2012 |
| JP | 2015-66963 A | | 4/2015 |
| JP | 2015-184722 A | | 10/2015 |
| WO | 2015/190212 A1 | | 12/2015 |

* cited by examiner

VEHICLE CONTROL APPARATUS

CROSS-REFERENCE TO RELATED APPLICATION

This application is based upon and claims the benefit of priority from the prior Japanese Patent Application No. 2016-239731, filed on Dec. 9, 2016, the entire contents of which are incorporated herein by reference.

BACKGROUND OF THE INVENTION

Field of the Invention

The present invention relates to a vehicle control technique.

Description of the Related Art

As a driver support technique, a technique of supporting the course change of a vehicle has been proposed. For example, Japanese Patent Laid-Open No. 2015-66963 discloses a technique of determining, in response to a driver's turn signal lever operation, whether a lane change is possible and, if the lane change is difficult, automatedly adjusting the vehicle speed while turning on a blinker.

A notification such as a blinker ON can call the attention of neighboring vehicles so that the course change readily succeeds. On the other hand, an excessive notification lacks consideration to the neighboring vehicles and is not adaptive to the traffic society. Additionally, if a course change notification is made in a case in which the course cannot immediately be changed because of the presence of a vehicle on the course change destination, the driver may feel uneasy.

SUMMARY OF THE INVENTION

It is an object of the present invention to improve the reliability of a course change while more appropriately making a course change notification.

According to an aspect of the present invention, there is provided a vehicle control apparatus capable of making a vehicle run by automated driving, comprising: a notification unit configured to notify a course change of the vehicle inside and/or outside the vehicle; and a control unit configured to control the notification unit, wherein the control unit switches the control of the notification unit stepwise in a case in which the course change of the vehicle is necessary before a predetermined point during the automated driving, at a first stage, the notification unit is caused to notify the course change on condition that a state in which the course change of the vehicle is enabled is set, and at a second stage at which the vehicle is closer to the predetermined point than at the first stage, the notification unit is caused to notify the course change without condition that the state in which the course change of the vehicle is enabled is set.

Further features of the present invention will become apparent from the following description of exemplary embodiments (with reference to the attached drawings).

DESCRIPTION OF THE EMBODIMENTS

First Embodiment

Figure 1:
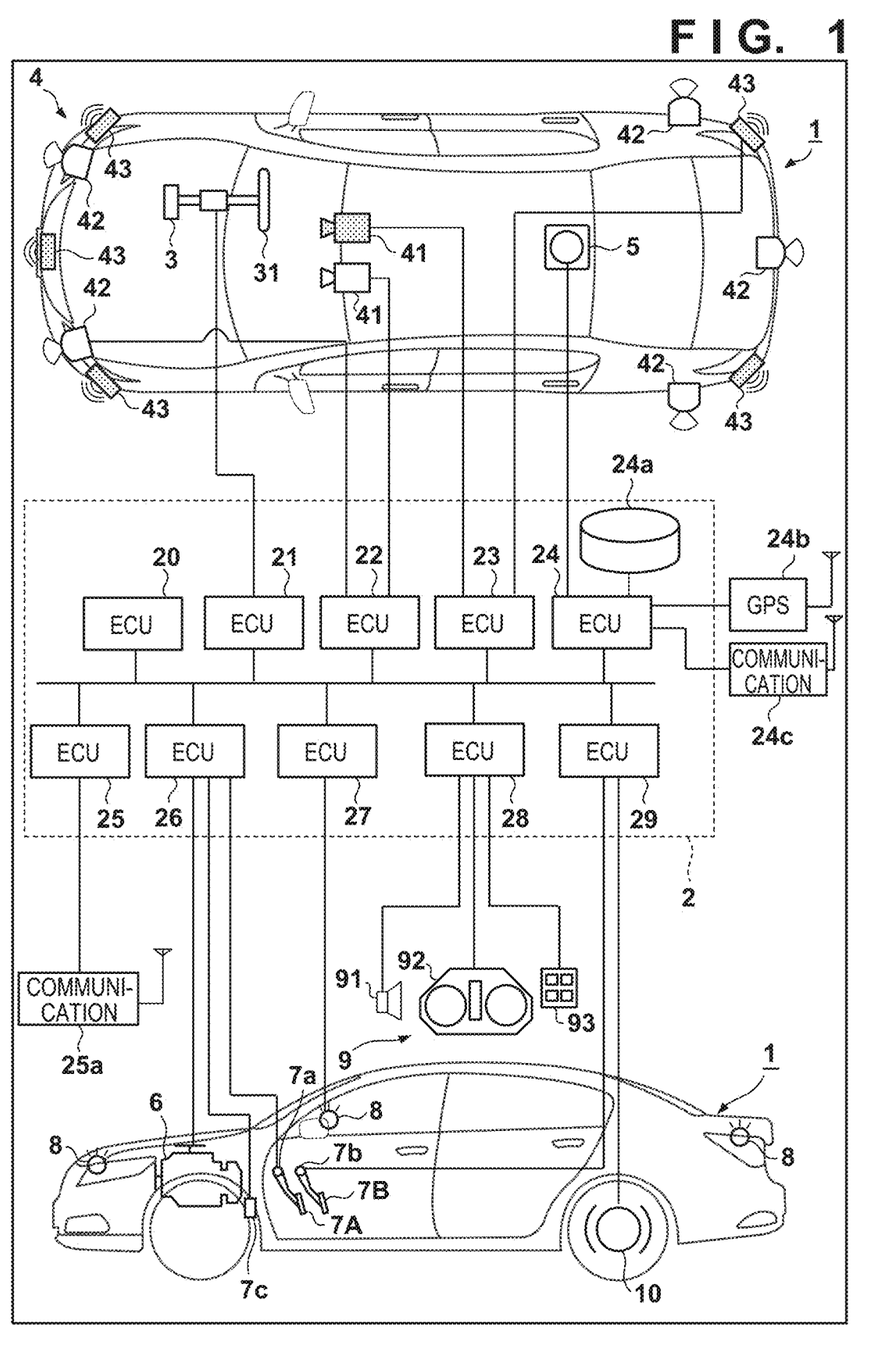
FIG. 1 is a block diagram of a vehicle control apparatus according to an embodiment.

FIG. 1 is a block diagram of a vehicle control apparatus according to an embodiment of the present invention, which controls a vehicle 1. Referring to FIG. 1, the schematic structure of the vehicle 1 is shown in a plan view and a side view. The vehicle 1 is, for example, a sedan-type four-wheel passenger car.

The control apparatus shown in FIG. 1 includes a control unit 2. The control unit 2 includes a plurality of ECUs 20 to 29 communicably connected by an internal network. Each ECU includes a processor represented by a CPU, a storage device such as a semiconductor memory, and an interface to an external device. The storage device stores a program to be executed by the processor and data to be used by the processor in processing. Each ECU may include a plurality of processors, a plurality of storage devices, and a plurality of interfaces.

Functions and the like of the ECUs 20 to 29 will be described below. Note that the number of ECUs and their functions can appropriately be designed, and the ECUs can be more subdivided or integrated than in this embodiment.

The ECU 20 executes control associated with automated driving of the vehicle 1. In the automated driving, at least one of steering and acceleration/deceleration of the vehicle 1 is automatedly controlled. In a control example to be described later, both the steering and the acceleration/deceleration are automatedly controlled.

The ECU 21 controls an electric power steering device 3. The electric power steering device 3 includes a mechanism that steers front wheels in accordance with a driver's driving operation (steering operation) on a steering wheel 31. In addition, the electric power steering device 3 includes a motor that generates a driving force to assist the steering operation or automatedly steer the front wheels, and a sensor that detects a steering angle. If the driving state of the vehicle 1 is automated driving, the ECU 21 automatedly controls the electric power steering device 3 in accordance with an instruction from the ECU 20, and controls the traveling direction of the vehicle 1.

The ECUs 22 and 23 perform control of detection units 41 to 43 configured to detect the ambient situation of the vehicle and information processing of detection results. The detection unit 41 is a camera (to be sometimes referred to as the camera 41 hereinafter) that captures the front of the vehicle 1. In this embodiment, two cameras are provided in the front portion of the roof of the vehicle 1. The outline of a target or a lane divider line (white line or the like) of a lane on a road can be extracted by analyzing an image captured by the camera 41.

The detection unit 42 is a lidar (Light Detection and Ranging) (to be sometimes referred to as the lidar 42 hereinafter), which detects a target around the vehicle 1 or measures the distance to the target. In this embodiment, five lidars 42 are provided, including one at each corner of the front portion of the vehicle 1, one at the center of the rear portion, and one on each side of the rear portion. The detection unit 43 is a millimeter wave radar (to be sometimes referred to as the radar 43 hereinafter), which detects a target around the vehicle 1 or measures the distance to the target. In this embodiment, five radars 43 are provided, including one at the center of the front portion of the vehicle 1, one at each corner of the front portion, and one at each corner of the rear portion.

The ECU 22 performs control of one camera 41 and the lidars 42 and information processing of detection results. The ECU 23 performs control of the other camera 41 and the radars 43 and information processing of detection results. Since two devices for detecting the ambient situation of the vehicle 1 are provided, the reliability of detection results can be improved. In addition, since different types of detection units such as a camera, a lidar, and a radar are provided, the ambient situation of the vehicle can be multilaterally analyzed.

The ECU 24 performs control of a gyro sensor 5, a GPS sensor 24b, and a communication device 24c and information processing of detection results or communication results. The gyro sensor 5 detects the rotational motion of the vehicle 1. The course of the vehicle 1 can be determined based on the detection result of the gyro sensor 5, a wheel speed, or the like. The GPS sensor 24b detects the current position of the vehicle 1. The communication device 24c performs wireless communication with a server that provides map information or traffic information and acquires these pieces of information. The ECU 24 can access a map information database 24a formed in the storage device. The ECU 24 searches for a route from the current location to the destination.

The ECU 25 includes a communication device 25a for inter-vehicle communication. The communication device 25a performs wireless communication with another vehicle in the neighborhood, and exchanges information with the vehicle.

The ECU 26 controls a power plant 6. The power plant 6 is a mechanism that outputs a driving force to rotate the driving wheels of the vehicle 1, and includes, for example, an engine and a transmission. The ECU 26 controls the output of the engine in accordance with, for example, a driver's driving operation (accelerator operation or acceleration operation) detected by an operation detection sensor 7a provided on an accelerator pedal 7A, or switches the gear position of the transmission based on the information of a vehicle speed detected by a vehicle speed sensor 7c or the like. If the driving state of the vehicle 1 is automated driving, the ECU 26 automatedly controls the power plant 6 in accordance with an instruction from the ECU 20, and controls the acceleration/deceleration of the vehicle 1.

The ECU 27 controls lighting equipment (a headlight, a tail light, and the like) including direction indicators 8 (blinkers). In the example of FIG. 1, the direction indicators 8 are provided on the front portions, the door mirrors, and the rear portions of the vehicle 1.

The ECU 28 controls an input/output device 9. The input/output device 9 outputs information for the driver, and accepts input of information from the driver. A voice output device 91 notifies the driver of information by a voice. A display device 92 notifies the driver of information by displaying an image. The display device 92 is arranged, for example, in front of the driver's seat and constitutes an instrument panel and the like. Note that although a voice and display have been exemplified here, information may be notified by a vibration or light. In addition, information may be notified by combining a plurality of means of a voice, display, vibration, and light. Furthermore, the combination or notification format may be changed in accordance with the level (for example, the degree of urgency) of information to be notified.

An input device 93 is a switch group arranged at a position where the driver can operate it and inputs an instruction to the vehicle 1. A voice input device may also be included.

The ECU 29 controls a brake device 10 and a parking brake (not shown). The brake device 10 is, for example, a disc brake device 10, which is provided in each wheel of the vehicle 1 and applies a resistance to the rotation of the wheel, thereby decelerating or stopping the vehicle 1. The ECU 29 controls the operation of the brake device 10 in accordance with, for example, a driver's driving operation (brake operation) detected by an operation detection sensor 7b provided on a brake pedal 7B. If the driving state of the vehicle 1 is automated driving, the ECU 29 automatedly controls the brake device 10 in accordance with an instruction from the ECU 20, and controls the deceleration and stop of the vehicle 1. The brake device 10 or parking brake can also operate to maintain the stop state of the vehicle 1. If the transmission of the power plant 6 includes a parking lock mechanism, this can be operated to maintain the stop state of the vehicle 1.

<Examples of Control>

Control associated with automated driving of the vehicle 1 executed by the ECU 20 will be described. If the driver instructs a destination and automated driving, the ECU 20 automatically controls running of the vehicle 1 to the destination in accordance with a guide route found by the ECU 24. In the automated control, the ECU 20 acquires information about the ambient situation of the vehicle 1 from the ECUs 22 and 23, and issues instructions to the ECUs 21, 26, and 29 based on the acquired information, thereby controlling the steering and acceleration/deceleration of the vehicle 1.

Figure 2:
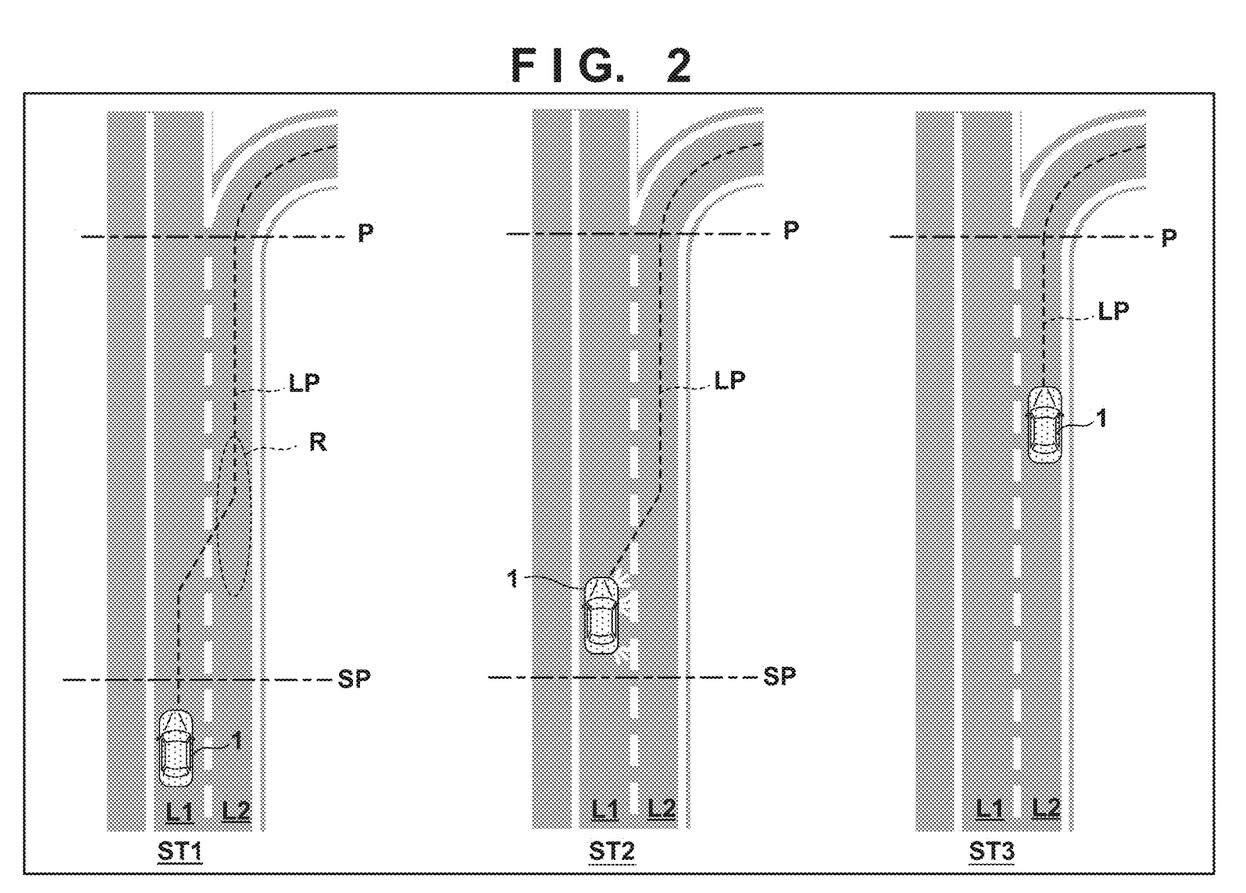
FIG. 2 is an explanatory view of an example of control at the time of a course change.

FIG. 2 shows an example of automated driving in a case in which a course is changed before a branch point stepwise and schematically. A lane L1 is a lane on which the vehicle 1 is running, and a lane L2 is a lane adjacent to the lane L1. On the downstream side, the lane L2 branches from the lane L1.

A state ST1 shows a state in which the vehicle 1 is going to change the course. In FIG. 2, a planned route LP indicates the scheduled running track (action plan) of the vehicle 1 made by the ECU 20 based on the guide route found by the ECU 24. As an example of the course change, a lane change from the lane L1 to the lane L2 is included.

Control is performed such that the lane change is done between a complete point P that is the limit necessary for the vehicle 1 to travel the branch road (lane L2) at the branch point and a start point SP at which the lane change operation is started. The start point SP is set, for example, at a predetermined distance before (for example, 2 km before) the complete point P. The distance from the complete point P, which defines the start point SP, may be a fixed value or a variable value. As a variable value, for example, if there are many other vehicles on the lane L2, the distance may be set relatively long. If there is not much traffic on the lane L2, the distance may be set relatively short. The congestion state of the lane L2 may be determined based on the detection results of the detection units 41 to 43 or traffic information acquired by the communication device 24c.

When the vehicle 1 passes the start point SP, the ECU 20 determines whether the vehicle can enter the lane L2. More specifically, the ECU 20 acquires, for example, the presence of a preceding vehicle and a succeeding vehicle running on the lane L2 and the vehicle speed from the ECUs 22 and 23, and determines whether there exists a space R that allows the vehicle 1 to enter the lane L2 without any interference with the vehicles.

Upon determining that the vehicle 1 can enter, the course change of the vehicle 1 is notified outside the vehicle 1 (notified to neighboring vehicles), as shown in a state ST2. In the example shown in FIG. 2, the direction indicator 8 is blinked to notify the lane change of the vehicle 1. After that, the lane change to the lane L2 is completed, as shown in a state ST3.

Depending on the congestion state of the lane L2, the space R may be absent, and the lane change may be difficult. Control in a case in which the lane change from the lane L1 to the lane L2 is difficult will be described with reference to FIG. 3.

Figure 3:
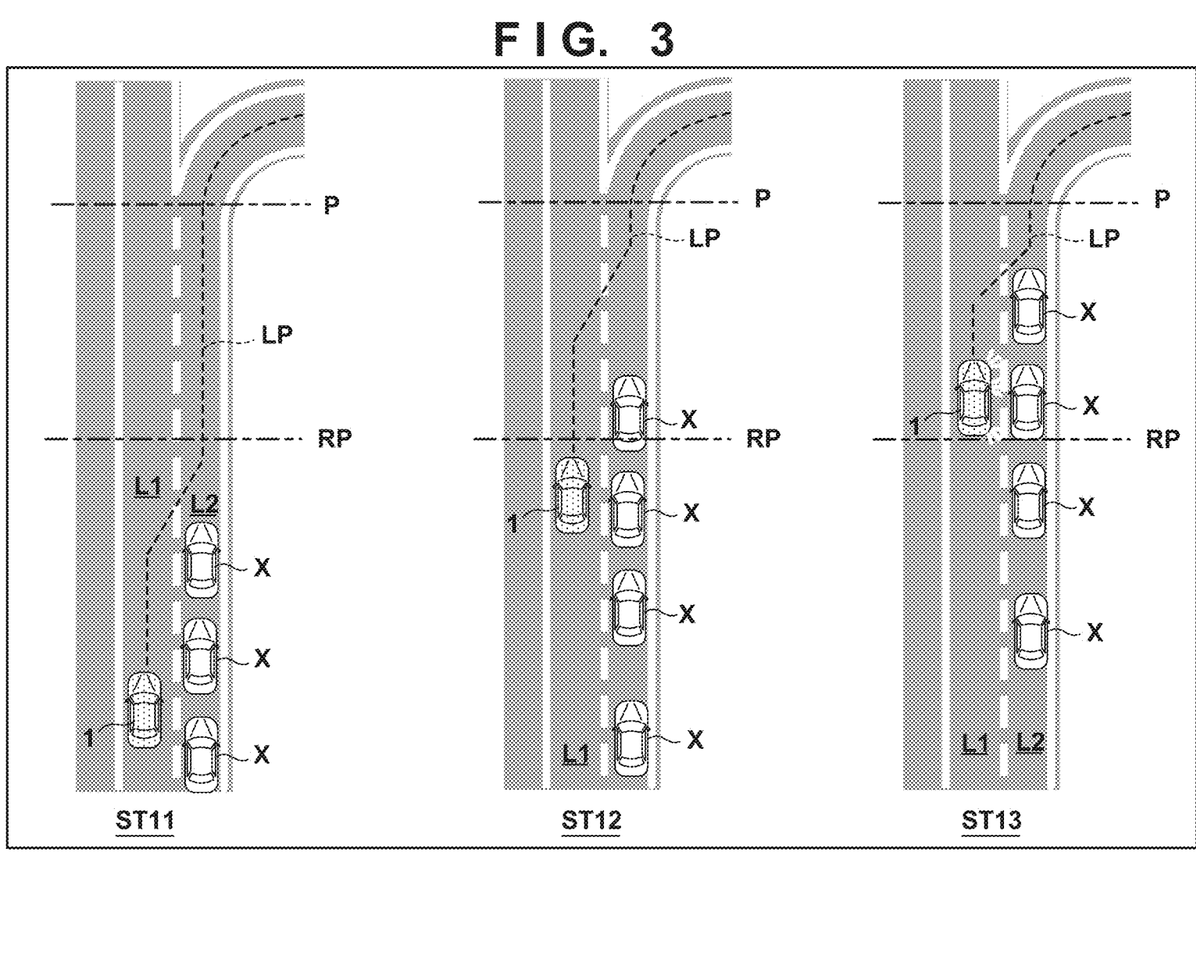
FIG. 3 is an explanatory view of an example of control at the time of a course change.

A state ST11 shows a state in which a line of other vehicles X exists on the lane L2, and the presence of the space R cannot be confirmed. If the direction indicator 8 is blinked to notify the intention to change the lane, some drivers in the other vehicles X may accept cutting into the line of vehicles. However, an early notification may give an impression of forcible cut-in on the occupants of the other vehicles X, and is not adaptive to the traffic society.

Hence, in this embodiment, control of the direction indicator 8 is switched stepwise. At a stage from the start point SP up to a reference point RP, the course change is notified on condition that the presence of the space R can be confirmed, and the state in which the course change is enabled is set. The reference point RP can be set, for example, at a predetermined distance before (for example, 1 km before) the complete point P. However, the reference point RP may be a point at a predetermined distance from the start point SP. Alternatively, the reference point RP may be a point determined in advance on map information.

If the vehicle comes close to the complete point P, the lane change cannot be completed in time. Hence, at a stage after reaching the reference point RP, the course change is notified without condition that the state in which the course change of the vehicle 1 is enabled is set. This can improve the reliability of the course change while considering the neighboring vehicles.

A state ST12 shown in FIG. 3 shows a state in which the presence of the space R cannot be confirmed, and the vehicle 1 does not reach the reference point RP yet. At this stage, blinking of the direction indicator 8 is not performed.

A state ST13 shown in FIG. 3 shows a state in which the vehicle 1 reaches the reference point RP without confirming the presence of the space R. At this stage, even if the presence of the space R cannot be confirmed, the direction indicator 8 is blinked to promote the other vehicles X to accept cutting into the line of vehicles. If some other vehicles X decelerate or stop to ensure the space R on the front side of them, the vehicle 1 changes the lane. The notification by the direction indicator 8 may be started on condition only that the vehicle reaches the reference point RP. However, any requirement other than the confirmation of the presence of the space R may also be used as a condition to be met.

The determination criterion for the confirmation of the presence of the space R may be changed in accordance with the running environment or the situation of neighboring vehicles. For example, if the remaining distance to the complete point P becomes short, the determination threshold may be changed so as to confirm the presence of the space R within a range to ensure safety. More specifically, in a case in which the determination threshold of the longitudinal length of the normal space R is set to about 2.5 times the total length of the vehicle of interest, the determination threshold may be changed to, for example, about 1.8 times the total length of the vehicle of interest if the remaining distance becomes short. Accordingly, the lane change is promoted from the viewpoint of control.

Similarly, if the speed relative to the vehicle running on the lane of the change destination decreases, if the speed of the vehicle of interest decreases, if the vehicle running on the lane of the change destination is small, or if the width of the lane of the change destination increases, the determination threshold may be changed so as to confirm the presence of the space R.

<Example of Processing of Course Change>

Figure 4:
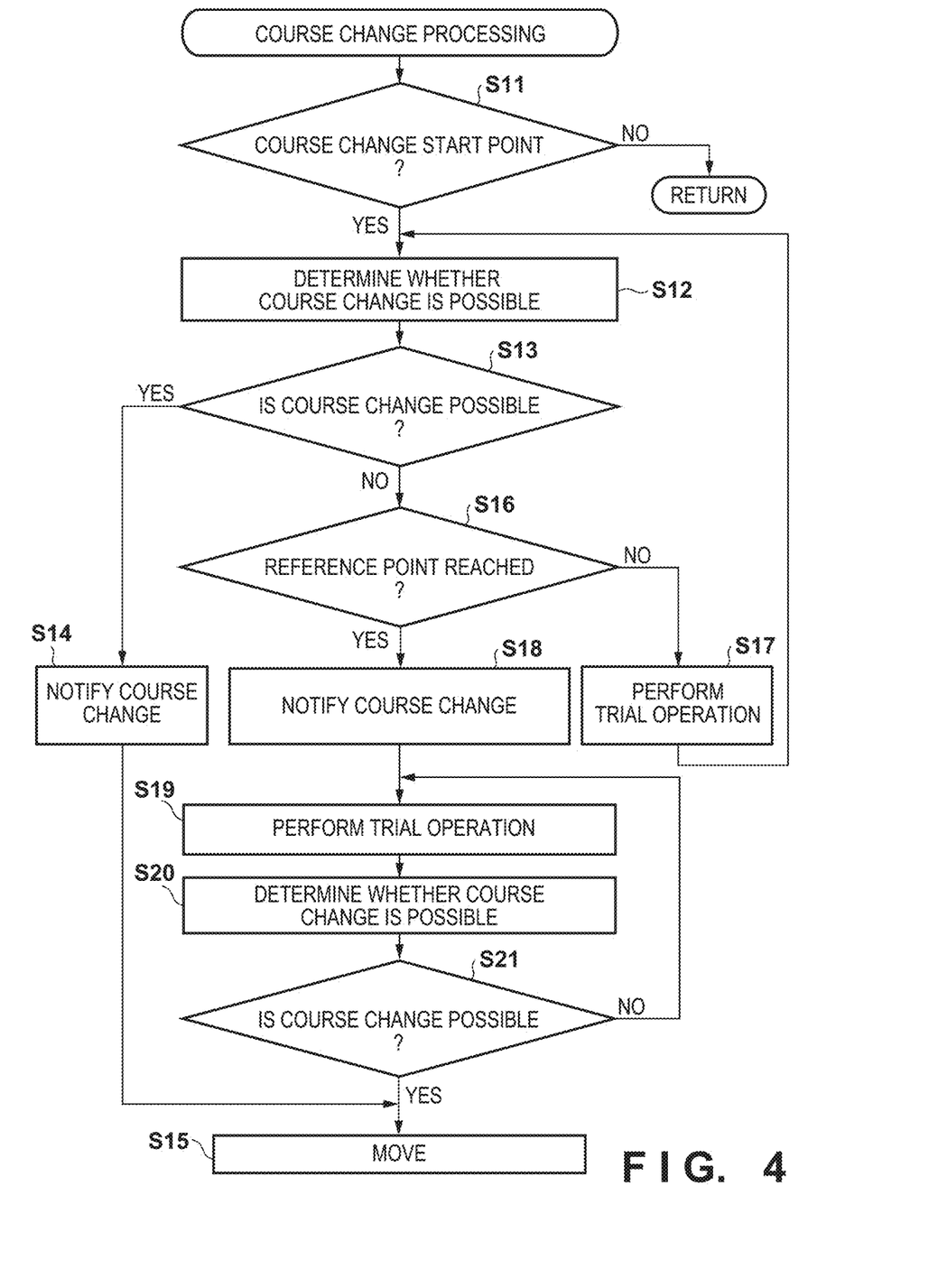
FIG. 4 is a flowchart showing course change processing.

An example of processing executed by the ECU 20 will be described. FIG. 4 is a flowchart showing course change processing. This processing is processing concerning a lane change described with reference to FIGS. 2 and 3.

In step S11, it is determined whether the vehicle 1 has reached the start point SP. If the vehicle 1 has reached the start point SP, the process advances to step S12. If the vehicle 1 has not reached the start point SP, the processing ends. In step S12, it is determined whether the course change is possible. Here, it is determined whether the space R described with reference to the state ST1 shown in FIG. 2 exists, and it is determined whether entry from the lane L1 to the lane L2 is possible. In step S13, based on the determination of step S12, if the course change is possible, the process advances to step S14. If the course change is not possible, the process advances to step S16. In step S14, a course change notification is made by the direction indicator 8, as shown in the state ST2 of FIG. 2. Next, in step S15, the lane change is done by automated driving, as shown in the state ST3 of FIG. 2.

In step S16, it is determined whether the vehicle 1 has reached the reference point RP. If the vehicle 1 has reached the reference point RP, the process advances to step S18. If the vehicle 1 has not reached the reference point RP, the process advances to step S17. In step S17, a lane change trial operation is performed, and the process returns to step S12. In the trial operation, for example, control is performed based on the detection results of the detection units 41 to 43 to accelerate/decelerate the vehicle 1 or maintain the current vehicle speed. This is processing for create or wait for a lane change enable state.

In step S18, a course change notification is made by the direction indicator 8, as shown in the state ST13 of FIG. 3. Although the state in which the course change is enabled is not set, the driver declares the intent of the course change to the neighbor by making the course change notification. In step S19, the lane change trial operation is performed. Since the vehicle is approaching the complete point P, this trial operation may be an operation of gradually decelerating and stopping before the complete point P, unlike the trial operation in step S17.

In step S20, it is determined whether the lane change is possible, as in step S12. In step S21, based on the determination result of step S20, if the course change is possible, the process advances to step S15. In step S15 after the processes of steps S16 to S21, the hazard lights may be blinked after the lane change. If it is determined in step S20 that the lane change is impossible, the process returns to step S19 to repeat the same processing as described above. If the lane change is impossible until just before the complete point P, processing (takeover) of switching the driving state of the vehicle 1 from automated driving to manual driving may be performed to leave the lane change driving operation to the driver of the vehicle 1.

Second Embodiment

In the first embodiment, an example in which the course change is notified outside the vehicle by the direction indicator 8 has been described. However, a notification may be made inside the vehicle 1 (made to a passenger in the vehicle 1) by a voice output device 91 or a display device 92. The notification may be made only inside the vehicle or outside and inside the vehicle. When the above-described stepwise control is applied to the notification to the inside of the vehicle, uneasy feeling given to the driver concerning the course change can be avoided, and the safe feeling of the driver or faith on the control can be increased.

Third Embodiment

Figure 5:
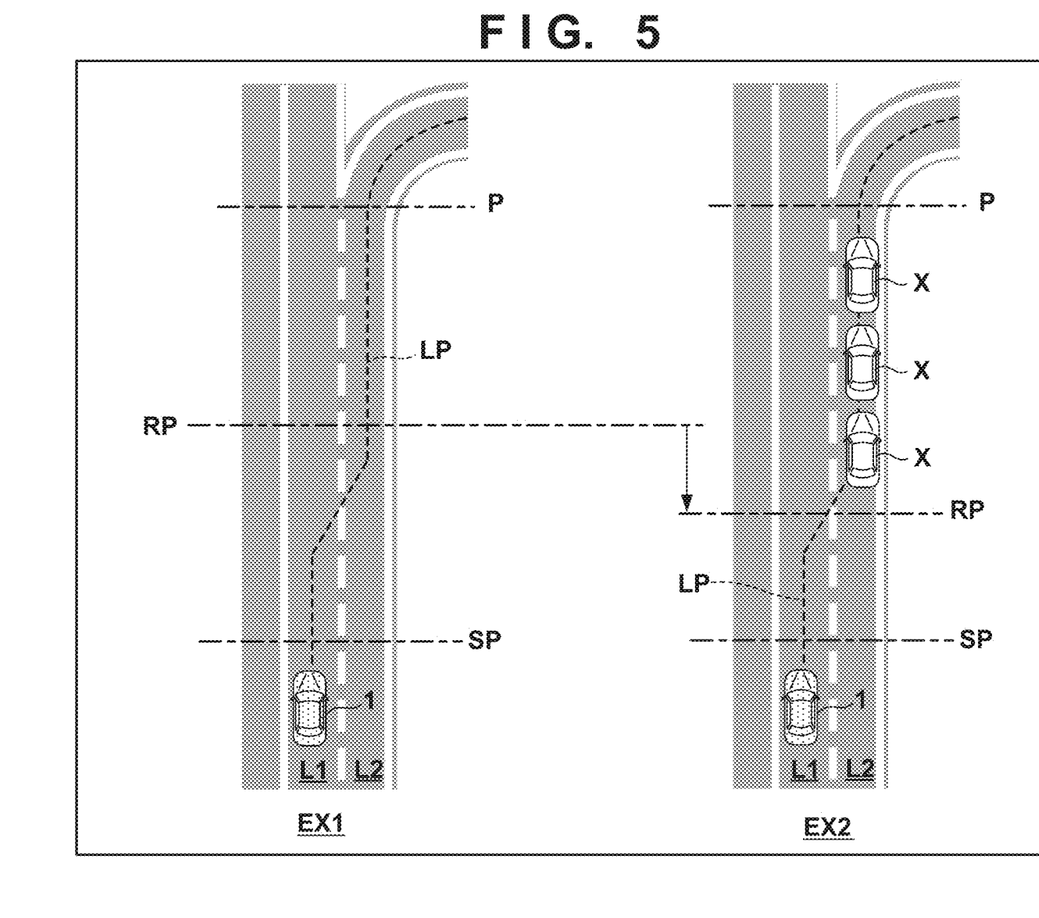
FIG. 5 is an explanatory view of an example of change of a reference point.

In the first embodiment, an example in which the reference point RP is set at a predetermined distance before the complete point P has been described. However, a reference point RP may be a variable point set based on the running environment. For example, the reference point RP may be changed in accordance with the crowding of neighboring vehicles. For example, as indicated by EX1 in FIG. 5, if traffic on a lane L2 is not much, the reference point RP may be set at a point relatively close to the complete point P. As indicated by EX2, if there are many other vehicles X on the lane L2, the reference point RP may be set at a point relatively far from the complete point P. The congestion state of the lane L2 may be determined based on the detection results of detection units 41 to 43 or traffic information acquired by a communication device 24c.

Fourth Embodiment

If a vehicle 1 reaches a reference point RP in a state in which the presence of a space R cannot be confirmed, a lane change notification may be made immediately. Alternatively, the notification may be made at a timing according to the positional relationship to other adjacent vehicles. For example, if a line of a plurality of other vehicles X exists on a lane L2 of the change destination, the notification may be started from a position shifted from the other adjacent vehicles X in the traveling direction. The positions of the other vehicles X can be determined based on the detection results of detection units 41 to 43.

Figure 6:
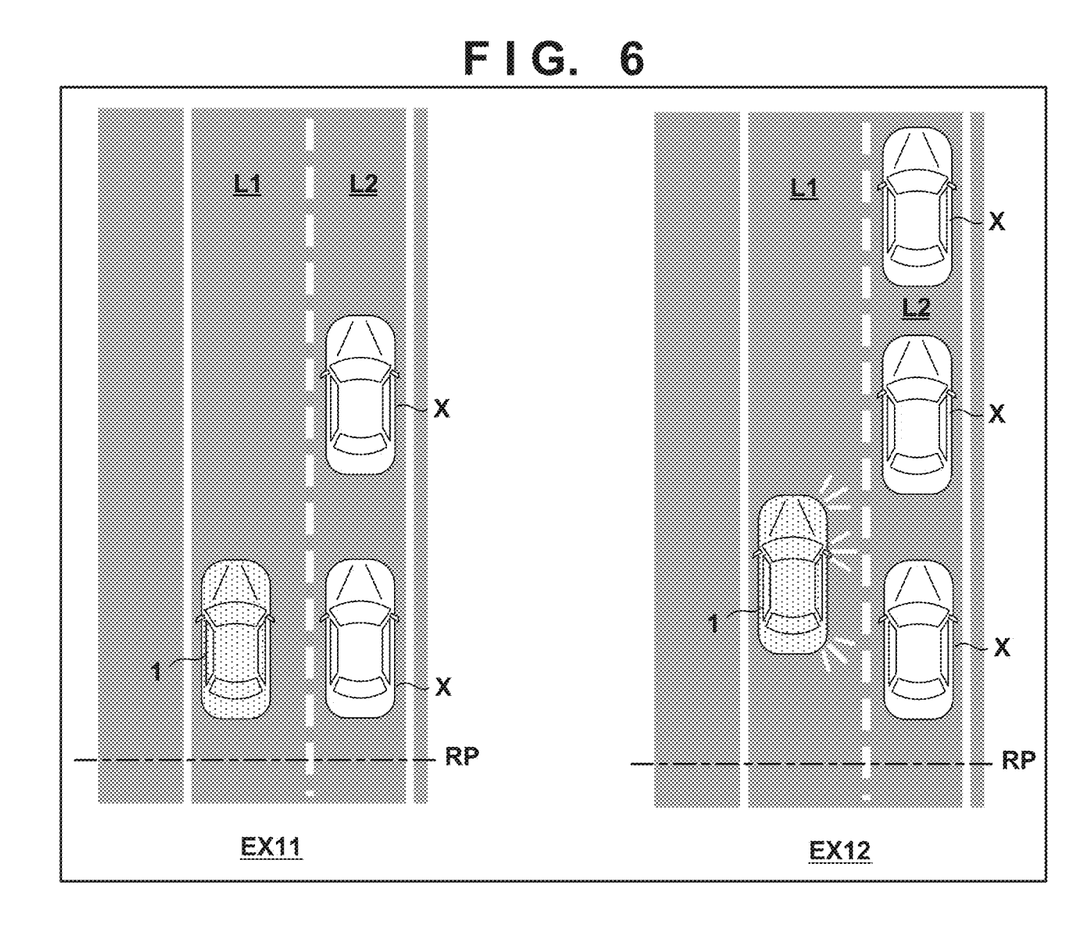
FIG. 6 is an explanatory view of an example of change of a notification timing.

FIG. 6 shows an example. EX11 shows a case in which the other vehicles X on the control unit 2 and the vehicle 1 are running side by side. Even if the vehicle 1 notifies the lane change in this state, the possibility that the other vehicles X decelerate or stop to ensure a space R on the front side of them is probably low. Hence, the lane change notification is not made although the vehicle 1 reaches the reference point RP.

EX12 shows a state in which the positional relationship between the vehicle 1 and the other vehicles X has changed from EX11. The vehicle 1 and the other vehicles X shift in the traveling direction. At this stage, a lane direction notification is started. This raises the possibility that the other vehicle X located diagonally on the rear side of the vehicle 1 forms the space on the front side. The shift amount between the vehicles can be determined based on, for example, whether the other vehicle X is located on the rear side of the front end of the vehicle 1 at least ¼ or more of the total length.

Fifth Embodiment

In the above embodiments, the lane change notification is made when the presence of the space R is confirmed, and the vehicle immediately moves in the lane direction, or when the presence of the space R is not confirmed, and the vehicle waits for the lane change. In some cases, the driver of a vehicle 1 wants to know which notification state occurs. Hence, the notification manner of a direction indicator 8 may be changed depending on whether the state in which the course change of the vehicle 1 is enabled is set or not.

Figure 7:
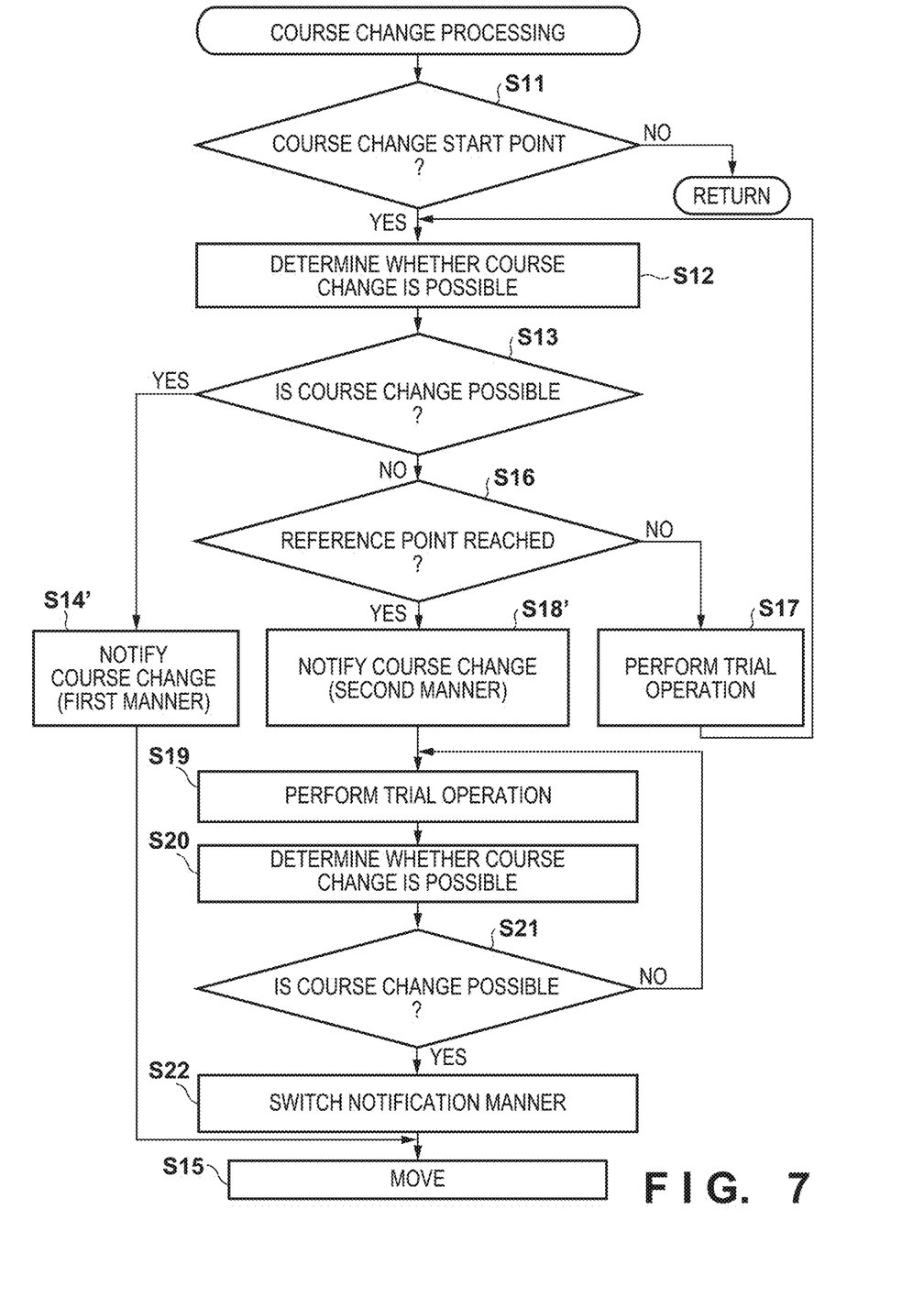
FIG. 7 is a flowchart showing course change processing according to another example.

FIG. 7 is a flowchart showing course change processing according to this embodiment. Only processes different from the processing example shown in FIG. 4 will be described.

In the example shown in FIG. 7, in step S14' corresponding to step S14 in FIG. 4, the course change notification by the direction indicator 8 is made in the first mode. In step S18' corresponding to step S18 in FIG. 4, the course change notification by the direction indicator 8 is made in the second mode. For example, the blinking period or light emission color of the direction indicator 8 is changed between the first mode and the second mode. This allows the driver of the vehicle 1 to discriminate between the notification when immediately shifting to the lane change and the notification when waiting for the lane change. Hence, the safe feeling of the driver or faith on the control can be increased.

Additionally, in the example shown in FIG. 7, the process of step S22 is performed after step S21. Here, the notification manner of the direction indicator 8 is switched and changed from the second mode to the first mode. This allows the driver of the vehicle 1 to confirm that the lane change waiting state has changed to a state in which the lane change can be executed.

Note that as described in the second embodiment, the lane change notification may be made to the inside of the vehicle by a display device 92 or the like. In this case as well, the notification manner of the display device 92 may be changed depending on whether the state in which the course change of the vehicle 1 is enabled is set or not. By the notification of the display device 92, the driver can easily confirm the notification contents. In a case in which notifications are made by both the direction indicator 8 and the display device 92 or voice output device 91, control to change the notification manner only for the display device 92 or voice output device 91 and inhibit the change of the notification manner for the direction indicator 8 may be employed.

Sixth Embodiment

In the above embodiments, the stepwise switching of the course change notification is done with reference to the reference point RP based on the distance from the complete point P. However, the switching may be done in accordance with the elapse of time. For example, when a predetermined time (for example, 1 min) has elapsed after reaching a start point SP, the course change may be notified without condition that state in which the course change of the vehicle 1 is enabled is set. When control is switched with reference to time, the lane change can easily be completed before the driver feels uneasy.

Figure 8:
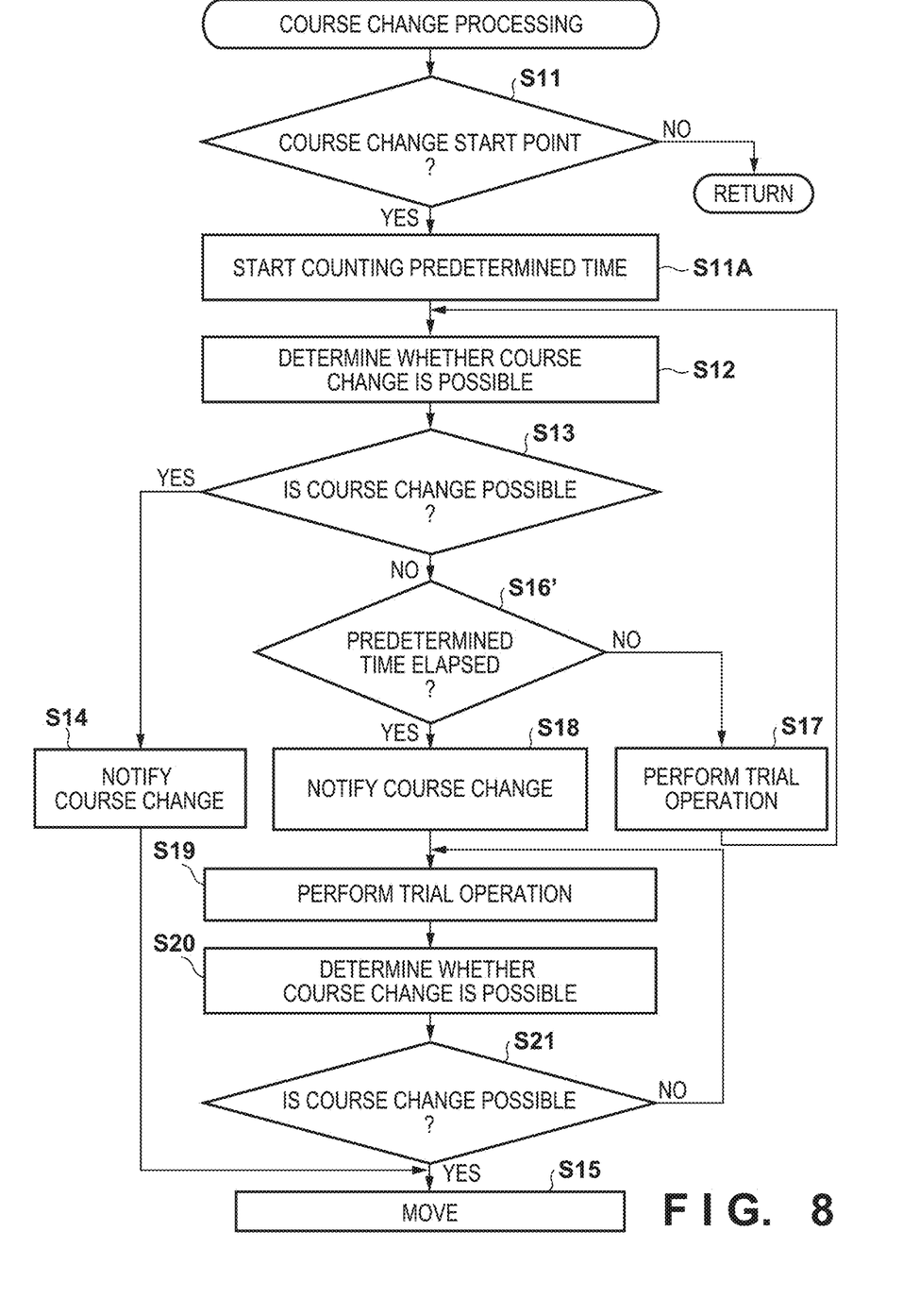
FIG. 8 is a flowchart showing course change processing according to still another example.

FIG. 8 is a flowchart of course change processing according to this embodiment. Only processes different from the processing example shown in FIG. 4 will be described. In the example shown in FIG. 8, if it is determined in step S11 that the vehicle 1 has reached the start point SP, counting of the predetermined time is started in step S11A. In place of step S16 shown in FIG. 4, in step S16' it is determined whether the predetermined time has elapsed. If the predetermined time has elapsed, the process advances to step S18. If the predetermined time has not elapsed, the process advances to step S17.

Note that this embodiment can be combined with the second to fourth embodiments. If the embodiment is combined with the second embodiment, the predetermined time can be changed in accordance with the crowding of neighboring vehicles. If the traffic is heavy, the predetermined time can be set relatively short. If there is not much traffic, the predetermined time can be set relatively long.

Seventh Embodiment

In the first embodiment, the lane change is notified outside the vehicle by the direction indicator 8. Independently of or in addition to this, the lane change may be notified outside the vehicle using inter-vehicle communication by a communication device 25a. The notification may be broadcast. The inter-vehicle communication allows the drivers of other vehicles X to easily know the intent of the lane change.

Eighth Embodiment

Figure 9:
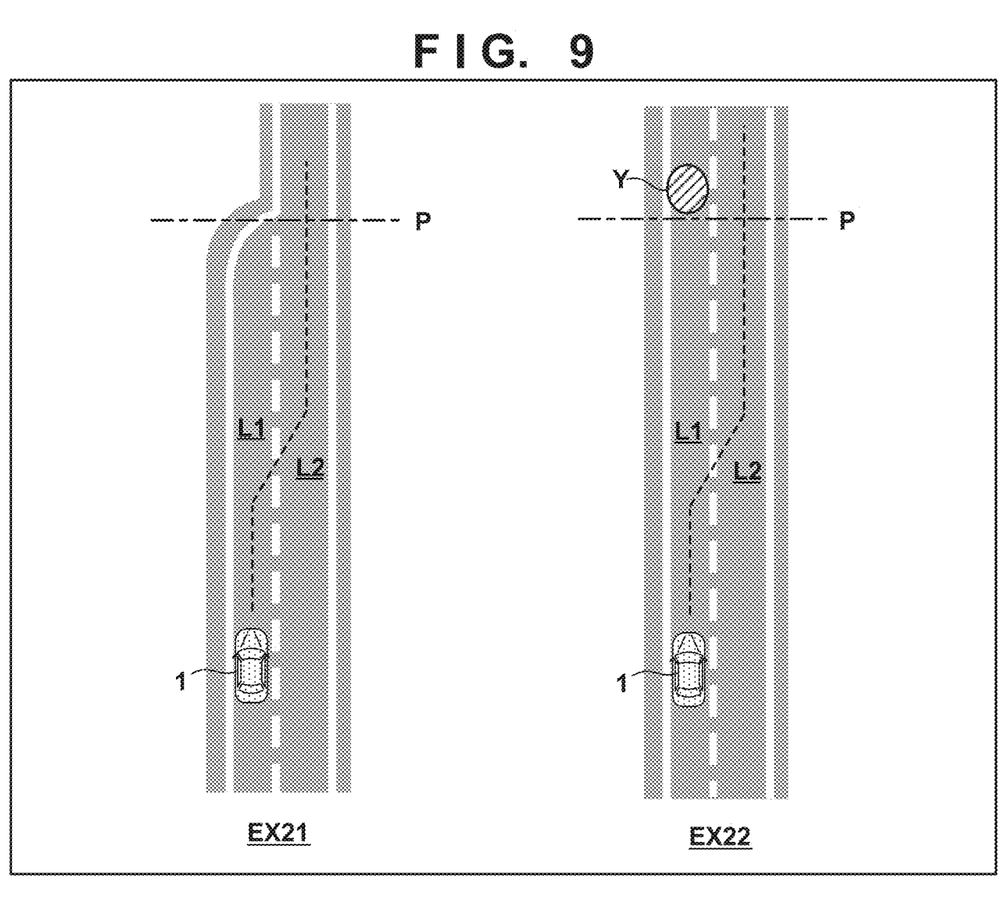
FIG. 9 is an explanatory view of another example of the course change.

In the above embodiments, a lane change at a branch point has been exemplified. However, the present invention can also be applied to another lane change. For example, the present invention can be applied to a lane change at a junction, as indicated by EX21 in FIG. 9. The present invention can also be applied to a lane change in a case in which an obstacle Y (for example, a stopped vehicle) exists on a running lane L1, as indicated by EX22 in FIG. 9. In the above embodiments, a lane change has been exemplified. However, the present invention can also be applied another course change without a lane change.

Summary of Embodiments

1. A vehicle control apparatus according to the above embodiment is a vehicle control apparatus capable of making a vehicle run by automated driving, including:

a notification unit (for example, 8, 25a, 91, 92) configured to notify a course change of the vehicle inside and/or outside the vehicle; and a control unit (for example, 20) configured to control the notification unit, wherein the control unit switches the control of the notification unit stepwise in a case in which the course change of the vehicle is necessary before a predetermined point during the automated driving, at a first stage, the notification unit is caused to notify the course change on condition that a state in which the course change of the vehicle is enabled is set (for example, ST2, EX12), and at a second stage at which the vehicle is closer to the predetermined point than at the first stage, the notification unit is caused to notify the course change without condition that the state in which the course change of the vehicle is enabled is set (for example, EX13).

According to this embodiment, it is possible to improve the reliability of the course change while more appropriately making the course change notification.

2. In the vehicle control apparatus according to the above embodiment, the control unit is configured to acquire information regarding crowding of neighboring vehicles and switches the control from the first stage to the second stage based on the information (for example, FIG. 5).

According to this embodiment, it is possible to improve the reliability of the course change while more appropriately making the course change notification in correspondence with the crowding of the neighboring vehicles.

3. In the vehicle control apparatus according to the above embodiment, the control unit is configured to change a notification manner of the notification unit depending on whether the state in which the course change of the vehicle is enabled is set at the second stage (for example, S22).

According to this embodiment, it is possible to let the driver know whether the course change of the vehicle is possible or is waited and increase the safe feeling of the driver or faith on the control.

4. In the vehicle control apparatus according to the above embodiment, the control unit is configured to set a reference point (for example, RP) before the predetermined point and switches the control from the first stage to the second stage upon reaching the reference point.

According to this embodiment, a distance needed to complete the course change can easily be ensured.

5. In the vehicle control apparatus according to the above embodiment, the control unit switches the control from the first stage to the second stage in accordance with an elapse of time (for example, S16').

According to this embodiment, the control is switched with reference to time, thereby easily completing the lane change before the driver feels uneasy.

6. In the vehicle control apparatus according to the above embodiment, the notification unit includes a communication unit (for example, 25a) between the vehicle of interest and another vehicle.

According to this embodiment, the driver of another vehicle can easily know the intent of the lane change.

7. In the vehicle control apparatus according to the above embodiment, a case in which the course change of the vehicle is necessary before the predetermined point is a case in which the lane change of the vehicle is necessary before the predetermined point.

According to this embodiment, it is possible to improve the reliability of the lane change while more appropriately making the course change notification.

8. In the vehicle control apparatus according to the above embodiment, the state in which the course change of the vehicle is enabled is set is a case in which it is determined that the vehicle can move to a lane of a change destination without interference with another vehicle (for example, S12).

According to this embodiment, it is possible to perform the lane change while avoiding interference with neighboring vehicles.

9. In the vehicle control apparatus according to the above embodiment, if a line of a plurality of other vehicles exists on the lane of the change destination, the notification unit is caused to start the notification from a position shifted from the other adjacent vehicles in a traveling direction at the second stage (for example, FIG. 6).

According to this embodiment, it is possible to improve the reliability of the lane change.

10. A vehicle control apparatus according to the above embodiment is a vehicle control apparatus capable of making a vehicle run by automated driving, including:

a processor (for example, 20); and a storage device (for example, 20) configured to store a program to be executed by the processor, wherein when the processor executes the program (for example, FIG. 4), the apparatus switches control of a notification unit (for example, 8, 25a, 91, 92) configured to notify a course change of the vehicle inside and/or outside the vehicle stepwise in a case in which the course change of the vehicle is necessary before a predetermined point during the automated driving, at a first stage, the notification unit is caused to notify the course change on condition that a state in which the course change of the vehicle is enabled is set (for example, ST2, EX12), and at a second stage at which the vehicle is closer to the predetermined point than at the first stage, the notification unit is caused to notify the course change without condition that the state in which the course change of the vehicle is enabled is set (for example, EX13).

According to this embodiment, it is possible to improve the reliability of the course change while more appropriately making the course change notification.

11. A vehicle according to the above embodiment includes:

a detection unit (for example, 41-43) configured to detect an ambient situation of the vehicle;

a notification unit (for example, 8, 25a) configured to notify a course change of the vehicle inside and/or outside the vehicle; and a control unit (for example, 2) configured to control the vehicle, wherein the control unit can execute automated driving to make the vehicle run along a scheduled route based on a detection result of the detection unit, the control unit switches the control of the notification unit stepwise in a case in which the course change of the vehicle is necessary before a predetermined point during the automated driving, at a first stage, the notification unit is caused to notify the course change on condition that a state in which the course change of the vehicle is enabled is set (for example, ST2, EX12), and at a second stage at which the vehicle is closer to the predetermined point than at the first stage, the notification unit is caused to notify the course change without condition that the state in which the course change of the vehicle is enabled is set (for example, EX13).

According to this embodiment, it is possible to improve the reliability of the course change while more appropriately making the course change notification.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2016-239731, filed Dec. 9, 2016, which is hereby incorporated by reference herein in its entirety.

What is claimed is:

1. A vehicle control apparatus capable of making a vehicle run by automated driving, comprising:

a notification unit configured to notify a course change of the vehicle outside the vehicle; and a control unit configured to control the notification unit, wherein the control unit switches the control of the notification unit stepwise in a case in which the course change of the vehicle is necessary before a predetermined point during the automated driving, at a first stage, the notification unit is caused to notify the course change on condition that a state in which the course change of the vehicle is enabled is set, and at a second stage at which the vehicle is closer to the predetermined point than at the first stage, the notification unit is caused to notify the course change even if the course change of the vehicle is unable to occur due to a position of the vehicle relative to an adjacent vehicle, the notification unit starts to notify the course change following a shift in the position in a travelling direction from the adjacent vehicle which runs on a destination lane of the course change, and the shift occurring when a front end of the adjacent vehicle is positioned relative to a rear side of a front end of the vehicle in the traveling direction by at least ¼ of the total length of the vehicle.

2. The apparatus according to claim 1, wherein the control unit is configured to acquire information regarding crowding of neighboring vehicles and switches the control from the first stage to the second stage based on the information.

3. The apparatus according to claim 1, wherein the control unit is configured to change a notification manner of the notification unit depending on whether the state in which the course change of the vehicle is enabled is set at the second stage.

4. A vehicle control apparatus capable of making a vehicle run by automated driving, comprising:

a direction indicator configured to notify a course change of the vehicle outside the vehicle; and a control circuit including at least one processor, the control circuit being configured to control the direction indicator, wherein the control circuit switches the control of the direction indicator stepwise in a case in which the course change of the vehicle is necessary before a predetermined point during the automated driving, at a first stage, the direction indicator is caused to notify the course change on condition that a state in which the course change of the vehicle is enabled is set, and at a second stage at which the vehicle is closer to the predetermined point than at the first stage, the direction indicator is caused to notify the course change even if the course change of the vehicle is unable to occur due to a position of the vehicle relative to an adjacent vehicle, the direction indicator starts to notify the course change following a shift in the position in a travelling direction from the adjacent vehicle which runs on a destination lane for the course change, and the shift occurring when a front end of the adjacent vehicle is positioned relative to a rear side of a front end of the vehicle in the traveling direction by at least ¼ of a total length of the vehicle.

\* \* \* \* \*